United States Patent
Alvarez

(10) Patent No.: US 11,773,717 B2
(45) Date of Patent: Oct. 3, 2023

(54) DOWNHOLE APPARATUS TO DETERMINE MICROWAVE AND ACOUSTIC PROPERTIES OF CIRCULATING DRILL MUD

(71) Applicant: ARAMCO SERVICES COMPANY, Houston, TX (US)

(72) Inventor: Jose Oliverio Alvarez, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 250 days.

(21) Appl. No.: 17/389,976

(22) Filed: Jul. 30, 2021

(65) Prior Publication Data

US 2023/0036565 A1 Feb. 2, 2023

(51) Int. Cl.
*E21B 47/16* (2006.01)
*E21B 49/00* (2006.01)

(52) U.S. Cl.
CPC ............ *E21B 47/16* (2013.01); *E21B 49/003* (2013.01)

(58) Field of Classification Search
CPC . B60W 50/14; B60W 50/085; B60W 2556/10
See application file for complete search history.

(56) References Cited

U.S. PATENT DOCUMENTS

| | | | |
|---|---|---|---|
| 6,829,947 B2 | 12/2004 | Han et al. | |
| 9,494,033 B2 | 11/2016 | Taherian et al. | |
| 10,151,159 B2 | 12/2018 | Gottlieb et al. | |
| 10,845,224 B2 | 11/2020 | Noui-Mehidi | |
| 2002/0101373 A1* | 8/2002 | Arndt | G01S 15/584 |
| | | | 342/52 |
| 2020/0190970 A1 | 6/2020 | Alvarez | |

FOREIGN PATENT DOCUMENTS

| | | |
|---|---|---|
| WO | 2008024807 A3 | 10/2013 |
| WO | 2014020335 A2 | 2/2014 |
| WO | 2017003500 A1 | 1/2017 |

* cited by examiner

*Primary Examiner* — Nabil H Syed
*Assistant Examiner* — Cal J Eustaquio
(74) *Attorney, Agent, or Firm* — Osha Bergman Watanabe & Burton LLP

(57) ABSTRACT

A system includes a housing configured to be secured to the casing string. The housing has a ring shape defining a central orifice for passage of the fluid and an interior surface facing the central orifice. A reflectometer is mounted on the interior surface and is configured to emit a microwave signal into the fluid in the central orifice, receive a reflected microwave signal from the central orifice, and determine a microwave reflection parameter. An acoustic transceiver is also mounted on the interior surface and is configured to emit an acoustic signal into the fluid in the central orifice, receive a reflected acoustic signal from the central orifice, and determine an acoustic reflection parameter. A processor is configured to determine the property of the fluid from the microwave reflection parameter and the acoustic reflection parameter.

20 Claims, 5 Drawing Sheets

DOWNHOLE APPARATUS TO DETERMINE MICROWAVE AND ACOUSTIC PROPERTIES OF CIRCULATING DRILL MUD

BACKGROUND

Hydrocarbon fluids are often found in hydrocarbon reservoirs located in porous rock formations far below the earth's surface. Wells may be drilled to extract the hydrocarbon fluids from the hydrocarbon reservoirs. Wells are drilled, in part, using drilling mud. Drilling mud may be any number of liquid and gaseous fluids as well as mixtures of fluids and solids. Drilling mud may be used to transport cuttings from the wellbore, lubricate the drill bit, and control the pressures within the wellbore.

During drilling operations, over pressured hydrocarbon zones may be encountered, and high-pressured gas or other hydrocarbons may enter the drilling fluid. This phenomenon is called a kick. If kicks are detected too late, various emergency procedures may be put in place as kicks negatively affect health and safety if they are allowed to reach the surface. Therefore, the ability to detect kicks before emergency procedures may be put in place is beneficial.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure presents, in one or more embodiments, a system and a method for measuring a property of a fluid in a wellbore having a casing string. The system includes a housing configured to be secured to the casing string. The housing has a ring shape defining a central orifice for passage of the fluid and an interior surface facing the central orifice. A reflectometer is mounted on the interior surface and is configured to emit a microwave signal into the fluid in the central orifice, receive a reflected microwave signal from the central orifice, and determine a microwave reflection parameter. An acoustic transceiver is also mounted on the interior surface and is configured to emit an acoustic signal into the fluid in the central orifice, receive a reflected acoustic signal from the central orifice, and determine an acoustic reflection parameter. A processor is configured to determine the property of the fluid from the microwave reflection parameter and the acoustic reflection parameter.

In one or more embodiments, the method for determining the property of the fluid includes deploying a measurement system into the wellbore. The measurement system includes a housing having a ring shape defining a central orifice for passage of the fluid and an interior surface facing the central orifice where a reflectometer and an acoustic transceiver are mounted on the interior surface. The method further includes emitting a microwave signal from the reflectometer into the fluid, emitting an acoustic signal from the acoustic transceiver into the fluid, receiving, by the reflectometer, a reflected microwave signal from the central orifice, receiving, by the acoustic transceiver, a reflected acoustic signal from the central orifice, determining a microwave reflection parameter of the fluid and an acoustic reflection parameter of the fluid, and determining the property of the fluid from the microwave reflection parameter and the acoustic reflection parameter.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Figure 1:
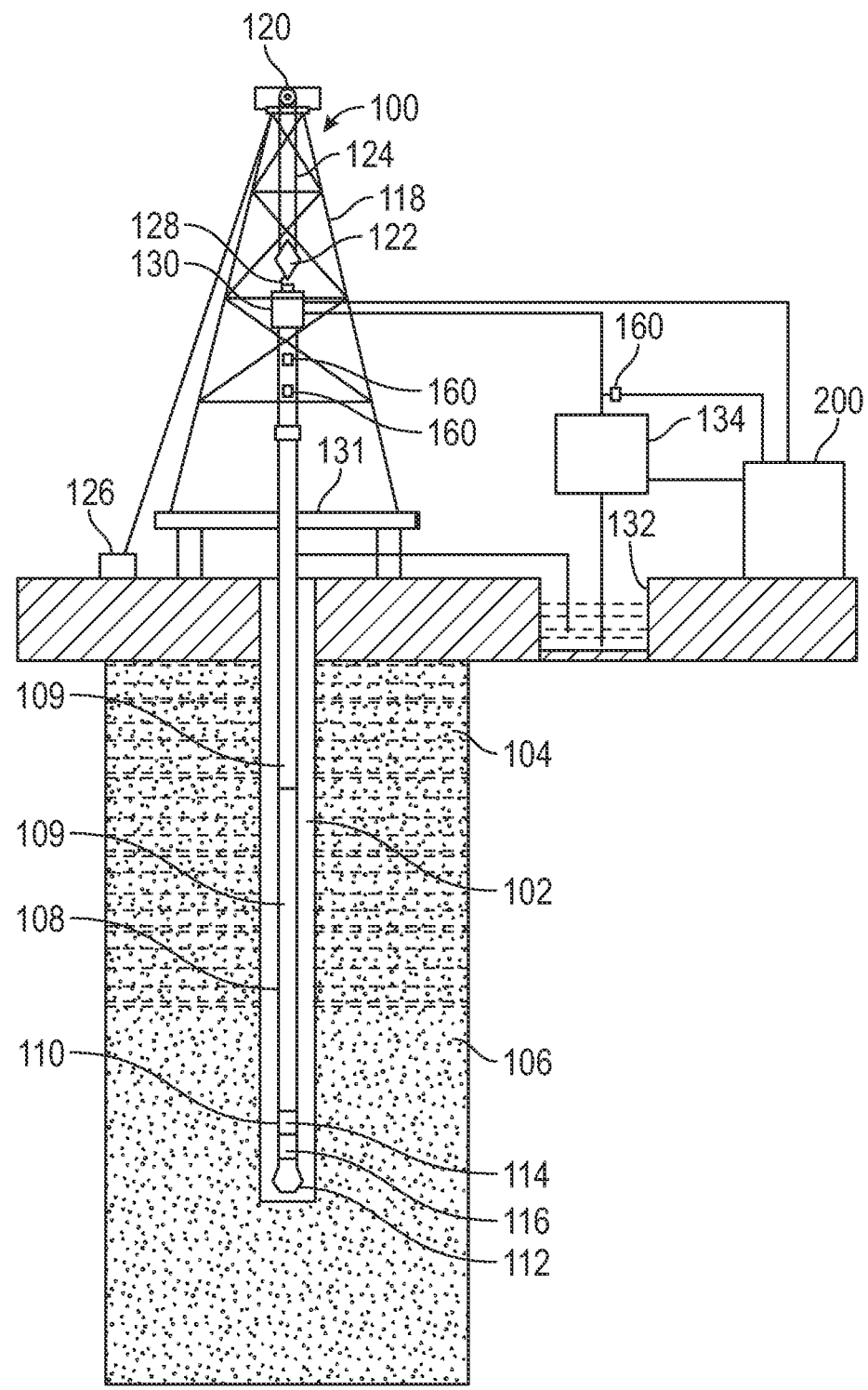
FIG. 1 shows a schematic diagram of an exemplary well site in accordance with one or more embodiments.

FIG. 1 illustrates an exemplary well site (100). In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104, 106).

For the purpose of drilling a new section of wellbore (102), a drill string (108) is suspended within the wellbore (102). The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that can be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling mud may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (200) may be disposed at or communicate with the well site (100). The system (200) may control at least a portion of a drilling operation at the well site (100) by providing controls to various components of the drilling operation. In one or more embodiments, system (200) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation).

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (200).

When drilling a wellbore (102), kicks are commonly detected by monitoring the levels in the mud tanks (132). Mud tank (132) levels stay relatively stable as the mud system is a closed system unless a well control situation is encountered. When formation fluids such as water, gas, or liquid hydrocarbons enter the drilling mud from the formation (104, 106), the levels in the mud tanks (132) rise. However, this indication is often missed or not detected until the kick is almost at the surface. Accordingly, embodiments disclosed herein provide systems and methods for detecting kicks early by measuring fluid properties such as a microwave reflection parameter, an acoustic reflection parameter, and permittivity. Changes in the reflection parameters and the permittivity indicate changes in the rheology of the drilling mud and thus whether or not a kick is present.

Figure 2:
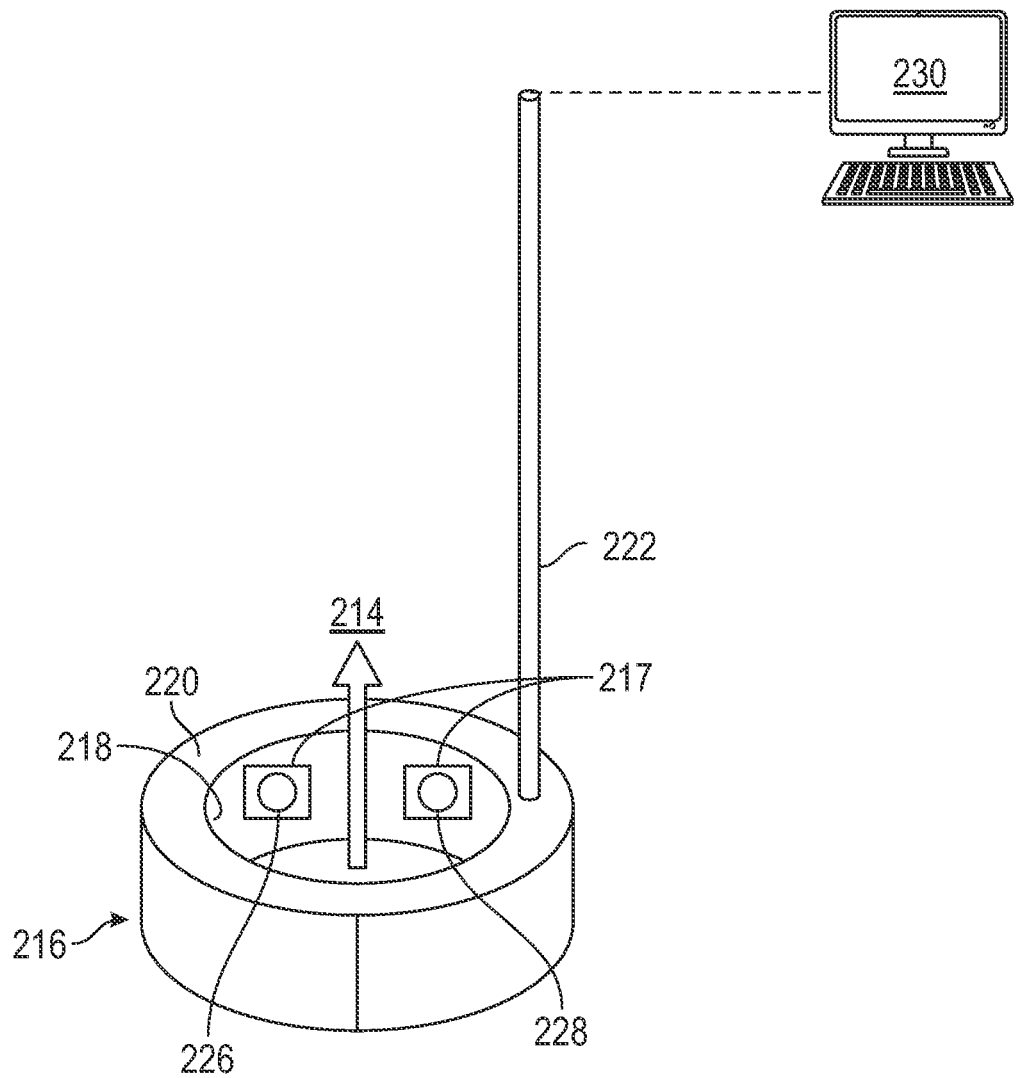
FIG. 2 shows a system for measuring a property of a fluid in accordance with one or more embodiments.

FIG. 2 shows a system for measuring a property of a fluid (214). The system includes a housing (216) having a ring shape defining a central orifice for passage of a fluid (214). In one or more embodiments, the fluid (214) may be drilling mud. The drilling mud may be an oil-based mixture or a water-based mixture. The housing (216) may be any temperature and pressure resistant material such as aluminum, stainless steel, titanium, etc. The housing (216) may have at least one window (217) that allows for transmission of microwave and acoustic signals. The window (217) may be located on an interior surface (218) of the housing (216) where the interior surface (218) faces the central orifice. The window (217) may be made of materials such as PVDF, PBT, Hydex, HDPE, PS, PMMA, TPX, quartz, Noryl, rexolite, etc. or any combination of such materials.

In one or more embodiments, the inner diameter of the housing (216) may be between 9 and 24 inches, the outer diameter of the housing (216) may be between 11 and 30 inches. The height of the housing (216) may be any height, but a height between 6 and 12 inches is the most optimal. The housing (216) has the interior surface (218) facing the central orifice and a top surface (220) facing the direction in which a first cable (222) extends. A first end of the first cable (222) is fixed to the top surface (220) of the housing (216). The first cable (222) is stiff such that the first cable (222) has a minimal effect on the flow of the fluid (214). In one or more embodiments the first cable (222) may be made stiff by an aluminum cover.

A reflectometer (228) is a microwave transceiver and is mounted behind the window (217) on the interior surface (218) and is configured to emit a microwave signal into the fluid (214) in the central orifice. The microwave signal may transmit at a narrowband frequency in the GHz range. The reflectometer (228) is also configured to receive a reflected microwave signal from the central orifice. The reflectometer (228) may have an electromagnetic sensor including a horn antenna connected to the reflectometer (228).

An acoustic transceiver (226) is mounted behind the window (217) on the interior surface (218) and is configured to emit an acoustic signal into the fluid (214) in the central orifice. The acoustic transceiver (226) may be mounted behind the same window (217) as the reflectometer (228), or the acoustic transceiver (226) may be mounted behind a different window (217), as depicted in FIG. 2. The acoustic signal may be piezo electric and may transmit at ultrasonic frequencies in the KHz range. The acoustic transceiver (226) is also configured to receive a reflected acoustic signal from the central orifice.

The system as depicted in FIG. 2 shows both a reflectometer (228) and an acoustic transceiver (226) mounted to the housing (216), however the housing (216) may have only the reflectometer (228), only the acoustic transceiver (226), or a plurality of reflectometers (228) and/or a plurality of acoustic transceivers (226) without departing from the scope of the disclosure herein.

The reflectometer (228) analyzes the reflected microwave signal to determine a microwave reflection parameter of the fluid (214). In accordance with one or more embodiments, the microwave reflection parameter is an S11 parameter. An S11 parameter represents how much power has been reflected from the fluid (214). The acoustic transceiver (226) analyzes the reflected acoustic signal to determine an acoustic reflection parameter of the fluid (214). The system includes a processor (230) configured to determine a property of the fluid (214) such as permittivity, from the microwave reflection parameter, or density, from the acoustic reflection parameter. The processor (230) may be located at the surface, as shown in FIG. 2.

The processor (230) may convert the microwave reflection parameter to a permittivity value and the acoustic reflection parameter to an acoustic impedance value. A dielectric constant, the real part of the permittivity value, may be calculated from the magnitude of the microwave reflection parameter/S11 parameter. The acoustic impedance value may be used to determine density of the fluid (214). The processor (230) converts the reflection parameter(s) to these physical values (permittivity/density) by inverting the amplitude and phase of reflection coefficients.

The processor (230) may detect changes in the permittivity or the acoustic impedance values from a baseline signature to detect changes in the fluid rheology. In one or more embodiments and when the fluid (214) is the oil-based or water-based drilling mud, the presence of a kick may be detected if the permittivity values are consistently lower than the baseline signature, because the dielectric constant, derived from the permittivity, of gas is much lower than water and oil. For example, the dielectric constant is around 80 for water, 3 for oil, and 1.1 for gas. A drop in the microwave reflection parameter/S11 parameter indicates the presence of gas in the fluid (214) thus the presence of a gas kick. In further embodiments, the reflectometer (228) and the processor (230) are located in a sealed compartment within the housing (216).

A second end of the first cable (222) may extend to the processor (230) located at the surface, and the first cable (222) may be electrically conductive such that information may be transferred between the processor (230) and the housing (216). Through this connection, the processor (230) may instruct the reflectometer (228) and the acoustic transceiver (226) to emit the microwave signal and the acoustic signal, respectively. The processor (230) may be connected to a monitor that may be used to monitor and alert to the changes in the microwave/acoustic reflection parameters and the changes in permittivity values. There may be only one processor located in the housing (216) or at the surface, and the information may be transferred between the housing (216) and the processor (230) using any mechanism of information transfer such as wireless information transfer. In other embodiments, there may be both a processor (230) located in the housing (216) and at the surface.

Figure 3:
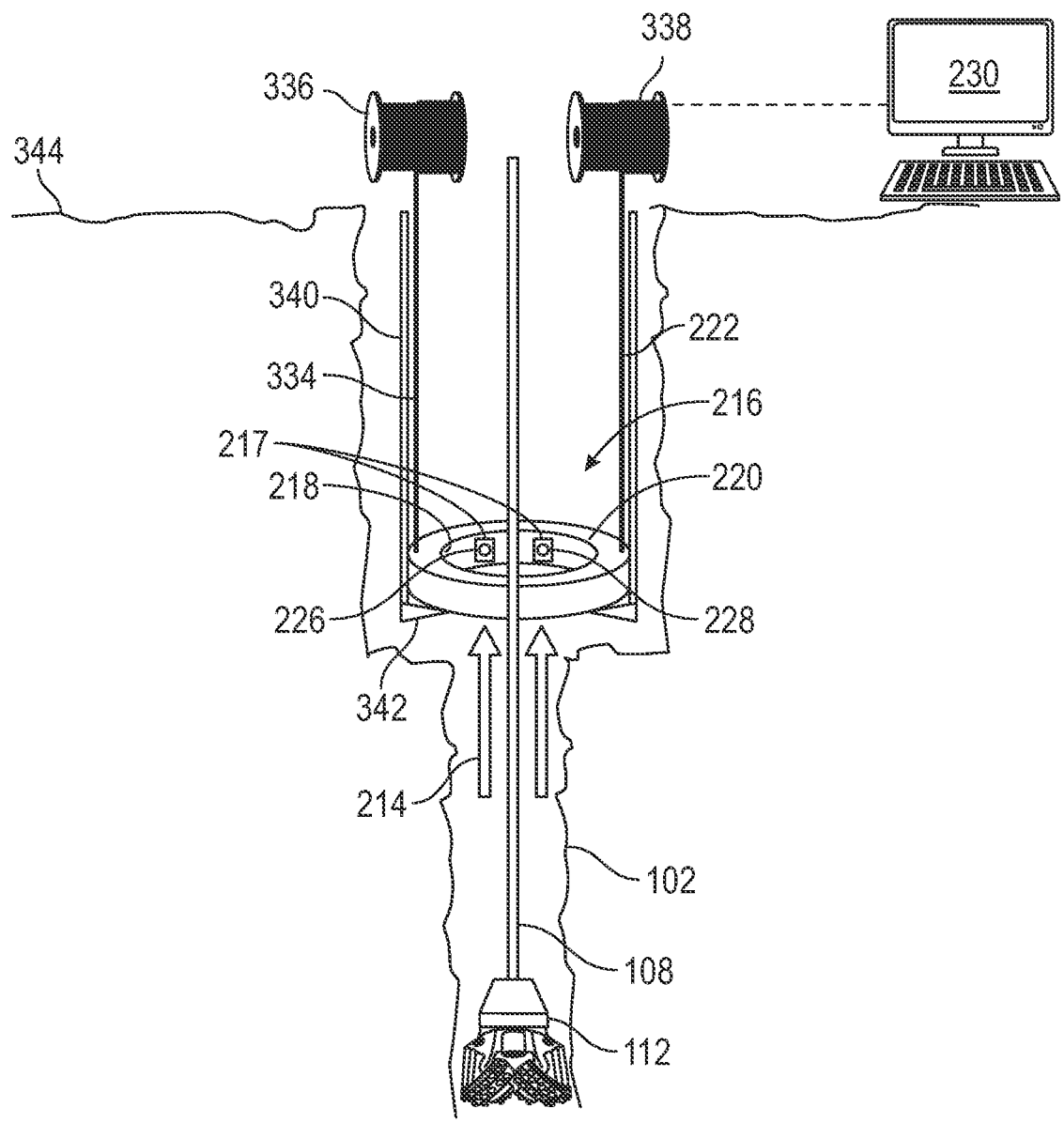
FIG. 3 shows a system for measuring a property of a fluid in accordance with one or more embodiments.

FIG. 3 depicts the system of FIG. 2 deployed in a wellbore (102) with at least one casing string (340). The components of the system depicted in FIG. 3 that are similar to the components of the system described in FIG. 2 are not re-described for purposes of readability, and have the same functions described above.

A first end of a second cable (334) is fixed to the top surface (220) of the housing (216). A second end of the second cable (334) extends to the surface (344) and may be connected to a second conveyance mechanism that is able to deploy or retract the housing (216) into the wellbore (102). The second conveyance mechanism may be a second spool (336) as depicted in FIG. 2. The surface (344) may be any location located outside of the wellbore (102) such as the drilling floor (131) or the ground surface. The second spool (336) rotates along an axis such that the second spool (336) may deploy or retract the second cable (334) to lower or pull the housing (216) from the wellbore (102).

The second end of the first cable (222) may be connected to a first conveyance mechanism that is able to deploy or retract the housing (216) into the wellbore (102). The first conveyance mechanism may be a first spool (336) as depicted in FIG. 2. The second end of the first cable (222) may also be connected (338) to the processor (230) at the surface (344). The first spool (338) rotates along an axis such that the first spool (338) may deploy or retract the first cable (222) to lower or pull the housing (216) from the wellbore (102). The first cable (222) and the second cable (334) may be stiff and stay in contact with/lay against the casing string (340) such that the cables (222, 334) minimally interact with the fluid (214) flow.

The housing (216) may be deployed in the wellbore (102) to seat on casing restrictions (342). A casing restriction (342) is where the casing string (340) of a larger diameter ends and a smaller diameter hole begins. The casing restrictions (342) may be at a depth that allows the first cable (222) and the second cable (334) to reach the surface (344); a depth that is deep enough to detect a kick and provide a reasonable amount of time to react; and a depth that is shallow enough to allow a kick to expand to a detectable size. A removable packer may be set within the casing string (340) and the housing (216) may seat on the removable packer. The removable packer may have a central orifice to allow for passage of a drill string (108) with a drill bit (112) to be deployed to drill new hole in the wellbore (102).

As the drill bit (112) builds hole, the processor (230) at the surface (344) may consistently monitor the microwave and acoustic reflection parameters by transmitting and receiving the microwave and acoustic signals into the fluid (214) by the reflectometer (228) and the acoustic transceiver (226), respectively. The acoustic transceiver (226) and reflectometer (228) may be calibrated at the surface (344) to provide a baseline signature in which to compare the measured microwave/acoustic reflection parameters, the permittivity, and the acoustic impedance to while drilling the wellbore (102).

Figure 4:
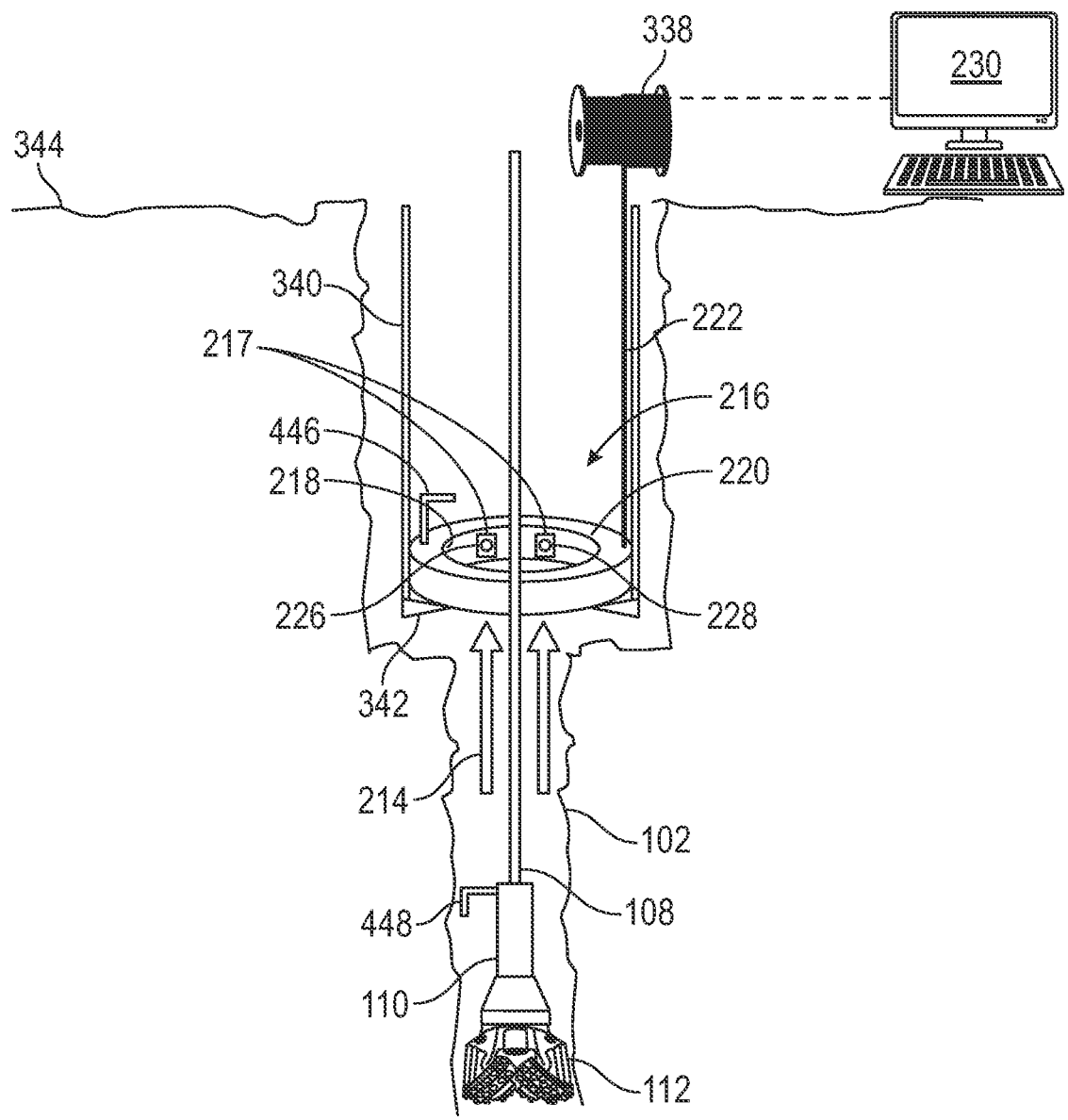
FIG. 4 shows a system for measuring a property of a fluid in accordance with one or more embodiments.

FIG. 4 depicts the system of FIG. 2 deployed in a wellbore (102) with at least one casing string (340). The components of the system depicted in FIG. 4 that are similar to the components of the system described in FIG. 2 are not re-described for purposes of readability, and have the same functions described above.

At least one first engagement device is fixed to the top surface (220) of the housing (216). The first engagement device may be any device such as a hook or a latch that may engage with another device. The embodiment described in FIG. 4 depicts a first hook (446) as the first engagement device. The first hook (446) is a piece of metal or other material that is curved or bent at an angle. The first hook (446) may be used to lower or pull the housing (216) from a wellbore (102). In further embodiments a BHA (110) may have at least one second engagement device that may engage or disengage with the first engagement device of the housing (216) to lower or retrieve the housing (216) from the wellbore (102) as the BHA (110) is tripped in or out of the wellbore (102). The second engagement device may be any device such as a hook or a latch that may engage with another device. The embodiment described in FIG. 4 depicts a second hook (448) as the second engagement device.

While tripping in the wellbore (102) and when the BHA (110) reaches the depth of placement, the second hook (448) releases the first hook (446) to allow the housing (216) to seat on casing restrictions (342) or on a removable packer deployed in the casing string (340). The depth of placement may be a depth that allows the first cable (222) to reach the surface (344); a depth that is deep enough to detect a kick and provide a reasonable amount of time to react; and a depth that is shallow enough to allow a kick to expand to a detectable size. While tripping out of the wellbore (102) and when the BHA (110) reaches the depth of placement, the second hook (448) catches the first hook (446) to pull the housing (216) from the wellbore (102).

In one or more embodiments, the second end of the first cable (222) may be connected to a first spool (338) as well as the processor (230) at the surface (344). The first spool (338) rotates along an axis such that the first spool (338) may deploy or retract the first cable (222). The first spool (338) along with the first hook (446) and BHA (110) may be used to help lower or pull the housing (216) from the wellbore (102). The first cable (222) may be stiff and stay in contact with the casing string (340) such that the first cable (222) minimally interacts with the fluid (214) flow. A drill string (108) with a drill bit (112) may be deployed through the central orifice of the housing (216) to drill new hole in the wellbore (102).

As the drill bit (112) builds hole, the processor (230) at the surface (344) may constantly monitor the microwave and acoustic reflection parameters by transmitting and receiving the microwave and acoustic signals into the fluid (214) by the reflectometer (228) and the acoustic transceiver (226), respectively. The acoustic transceiver (226) and reflectometer (228) may be calibrated at the surface (344) to provide a baseline signature in which to compare the measured microwave/acoustic reflection parameters and the permittivity to while drilling the wellbore (102).

Figure 5:
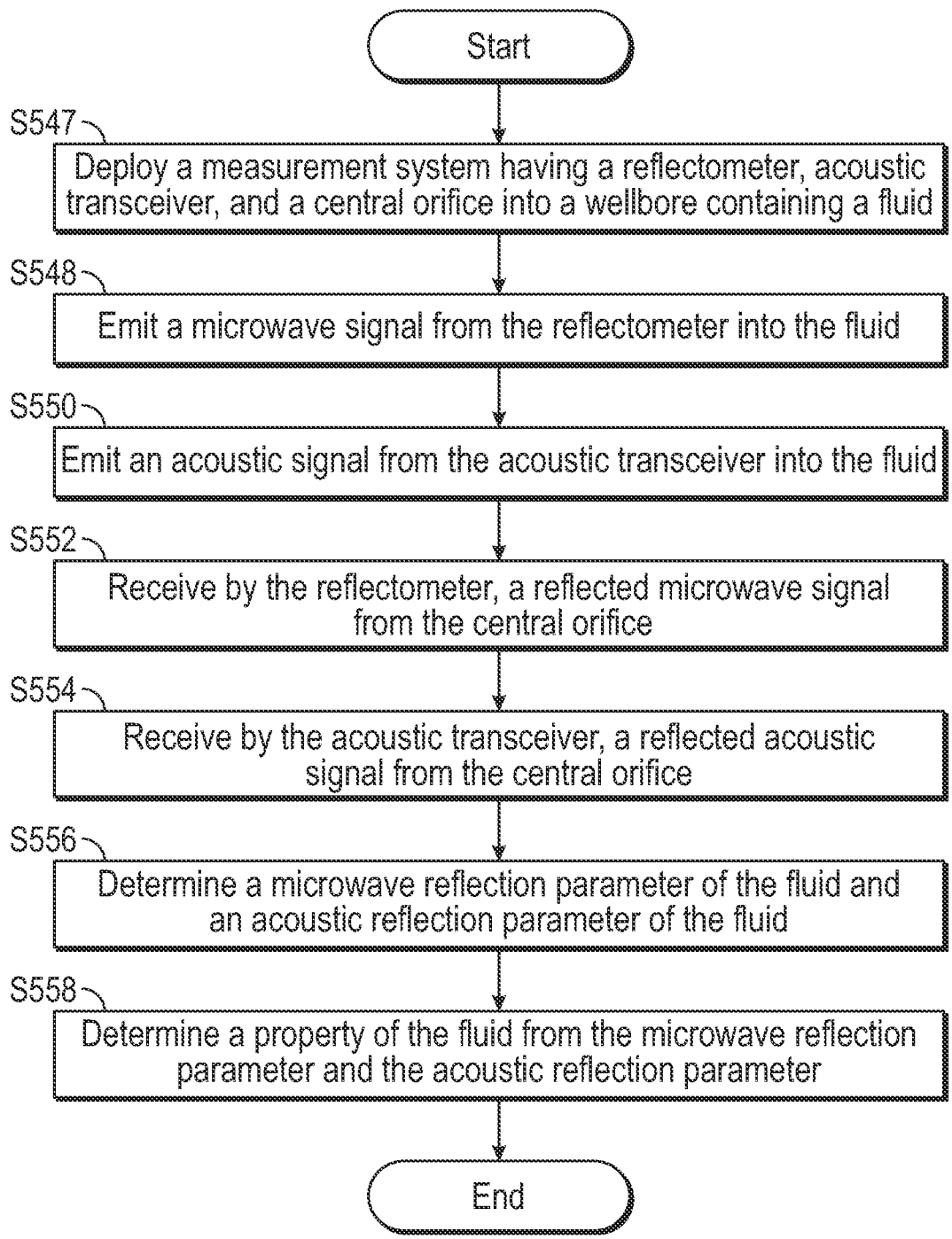
FIG. 5 shows a flowchart in accordance with one or more embodiments.

FIG. 5 depicts a flowchart in accordance with one or more embodiments. More specifically, FIG. 5 illustrates a method for measuring a property of a fluid (214) in a wellbore (102) having at least one casing string (340). Further, one or more blocks in FIG. 5 may be performed by one or more components as described in FIG. 2, FIG. 3, and FIG. 4 (e.g., processor (230)). While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Initially, a measurement system having at least one reflectometer (228) and at least one acoustic transceiver (226) is lowered into a wellbore (102) (S547). The housing (216) has a ring shape defining a central orifice for passage of the fluid (214) and an interior surface (218) of the housing (216) faces the central orifice. The reflectometer (s) (228) and the acoustic transceiver(s) (226) are mounted to the interior surface (218) of the housing (216) behind at least one window (217). The housing (216) may be lowered into the wellbore (102) by a first cable (222) and a second cable (334) connected to a first spool (338) and a second spool (336), respectively. The housing (216) may be lowered into the wellbore (102) using one cable and one spool. In other embodiments, the housing (216) may have at least one first hook (446) fixed to the to the top surface (220) of the housing (216). The first hook (446) interacts with a second hook (448) that is mounted to a non-rotating portion of the BHA (110). The second hook (448) connected to the first hook (446) lowers and pulls the housing (216) from the wellbore (102) as the BHA (110) is tripped into or out of the wellbore (102).

The housing (216) may be lowered to seat on casing restrictions (342) or on a removable packer set in the casing string (340). A drill string (108) with a drill bit (112) may be lowered through the housing (216) to drill new hole within the wellbore (102). As the drill bit (112) is drilling new hole, at least one microwave signal is emitted from the reflectometer(s) (228) into the fluid (214) flowing though the central orifice (S548). At least one acoustic signal is also emitted from the acoustic transceiver(s) (226) into the fluid (214) flowing through the central orifice (S550). The acoustic transceiver(s) (226) and the reflectometer(s) (228) may also emit signals when there is no drill string (108) in the wellbore (102) or when the drill bit (112) is not drilling new hole.

A reflected microwave signal from the fluid (214) is received by the reflectometer (228) (S552) and a reflected acoustic signal from the fluid (214) is received by the acoustic transceiver (226) (S554). The reflectometer (228) analyzes the reflected microwave signal to determine a microwave reflection parameter of the fluid (214). The microwave reflection parameter is a S11 parameter. The acoustic transceiver (226) analyzes the reflected acoustic signal to determine an acoustic reflection parameter of the fluid (214). A property of the fluid (214) is determined from the microwave reflection parameter and the acoustic reflection parameter using a processor (230) (S558).

In one or more embodiments, the processor (230) may be located within a sealed compartment within the housing (216). The property of the fluid (214) that may be measured may be permittivity or acoustic impedance (which may be used to calculate density). The permittivity is obtained by inverting the microwave reflection parameter, and the acoustic impedance is converted from the acoustic reflection parameter. The permittivity value, acoustic impedance value, or reflection parameters may be compared to a baseline signature to determine a change in the rheology of the fluid (214). This change in rheology may indicated the presence of a kick.

The baseline signature may be created by calibrating the acoustic transceiver (226) and reflectometer (228) at the surface (344). The processor (230) at the surface (344) may be connected to the housing (216) through the first cable (222). The processor (230) may be used to control the emission of the microwave and acoustic signals, and the processor (230) may be used to monitor and alert to the changes in the rheology of the fluid (214).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A system for measuring a property of a fluid in a wellbore having a casing string, the system comprising:
   a housing configured to be secured to the casing string, wherein the housing has a ring shape defining a central orifice for passage of the fluid and an interior surface facing the central orifice;
   a reflectometer mounted on the interior surface and configured to emit a microwave signal into the fluid in the central orifice, receive a reflected microwave signal from the central orifice, and determine a microwave reflection parameter;
   an acoustic transceiver mounted on the interior surface and configured to emit an acoustic signal into the fluid in the central orifice, receive a reflected acoustic signal from the central orifice, and determine an acoustic reflection parameter; and
   a processor configured to determine the property of the fluid from the microwave reflection parameter and the acoustic reflection parameter.

2. The system of claim 1,
   wherein the housing is configured to seat on a casing restriction.

3. The system of claim 1,
   wherein the housing is configured to seat on a removable packer set within the casing string.

4. The system of claim 1,
   wherein the processor comprises a processor located in a sealed compartment within the housing.

5. The system of claim 4, further comprising:
   a first cable connecting the housing to a surface location, wherein the first cable enables data transmission between the processor and the surface location.

6. The system of claim 5,
   wherein the first cable is connected to a first conveyance mechanism at the surface location.

7. The system of claim 6, further comprising:
   a second cable connecting the housing to a second conveyance mechanism at the surface location.

8. The system of claim 7,
   wherein the second cable is configured to lay against the casing string.

9. The system of claim 1, further comprising:
   a first engagement device mounted to a top surface of the housing.

10. The system of claim 9, further comprising:
    a second engagement device mounted to a bottom hole assembly, wherein the second engagement device is configured to interact with the first engagement device.

11. A method for measuring a property of a fluid in a wellbore having a casing string, the method comprising:
    deploying a measurement system into the wellbore, the measurement system comprising:
        a housing having a ring shape defining a central orifice for passage of the fluid and an interior surface facing the central orifice;
        a reflectometer mounted on the interior surface; and
        an acoustic transceiver mounted on the interior surface;
    emitting a microwave signal from the reflectometer into the fluid;
    emitting an acoustic signal from the acoustic transceiver into the fluid;
    receiving, by the reflectometer, a reflected microwave signal from the central orifice;
    receiving, by the acoustic transceiver, a reflected acoustic signal from the central orifice;
    determining a microwave reflection parameter of the fluid and an acoustic reflection parameter of the fluid; and
    determining the property of the fluid from the microwave reflection parameter and the acoustic reflection parameter.

12. The method of claim 11,
    wherein deploying the measurement system into the wellbore further comprises seating the housing on a casing restriction.

13. The method of claim 11,
    wherein deploying the measurement system into the wellbore further comprises seating the housing on a removable packer set within the casing string.

14. The method of claim 11,
    wherein determining the microwave reflection parameter of the fluid and the acoustic reflection parameter of the fluid comprises using the reflectometer and the acoustic transceiver.

15. The method of claim 11,
    wherein determining the property of the fluid further comprises using a processor.

16. The method of claim 11, further comprising:
    transferring information from the housing to a surface location using a first cable.

17. The method of claim 16,
    wherein deploying the measurement system further comprises using a first conveyance mechanism connected to the first cable.

18. The method of claim 17,
    wherein deploying the measurement system further comprises using a second conveyance mechanism connected to a second cable.

19. The method of claim 11,
    wherein deploying the measurement system further comprises engaging a first engagement device to a second engagement device, and, upon seating of the housing, disengaging the first engagement device from the second engagement device.

20. The method of claim 19, further comprising:
    retrieving the measurement system by engaging the first engagement device to the second engagement device.

* * * * *